May 15, 1928.

H. BANY 1,670,093

CONTROL SYSTEM

Filed June 17, 1924

Inventor:
Herman Bany,
by
His Attorney.

Patented May 15, 1928.

1,670,093

UNITED STATES PATENT OFFICE.

HERMAN BANY, OF SCHENECTADY, NEW YORK, ASSIGNOR TO GENERAL ELECTRIC COMPANY, A CORPORATION OF NEW YORK.

CONTROL SYSTEM.

Application filed June 17, 1924. Serial No. 720,692.

My invention relates to control systems and particularly to a control system for effecting a desired connection, such as a connection between the field winding of a synchronous machine and a suitable source of excitation, when a synchronous machine reaches synchronous speed after being started, and one object of my invention is to provide an improved, simple and reliable arrangement for accomplishing this result.

My invention will be better understood from the following description when taken in connection with the accompanying drawing and its scope will be pointed out in the appended claims.

Figure 1:
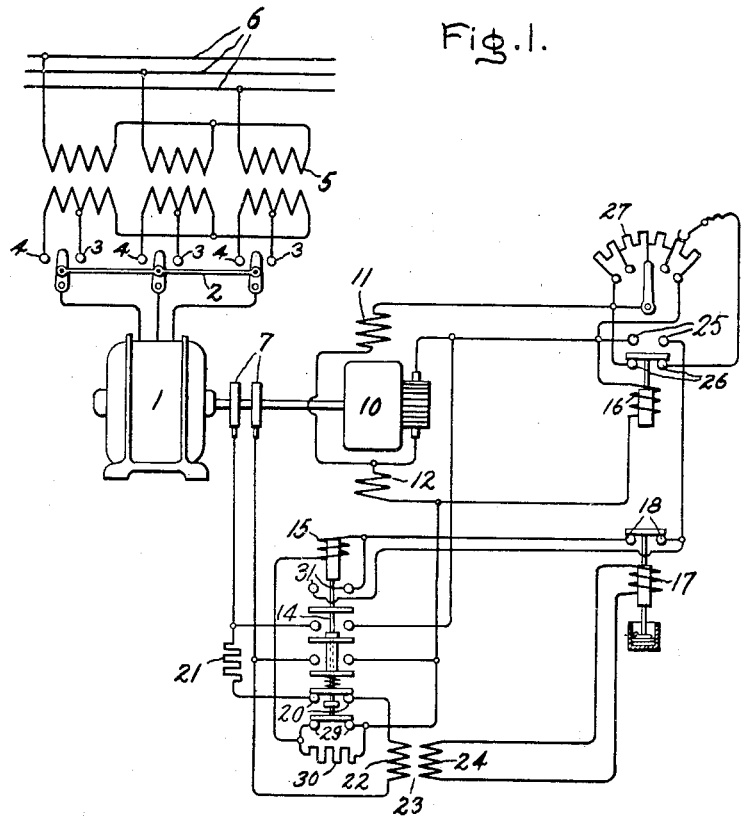
Figure 2:
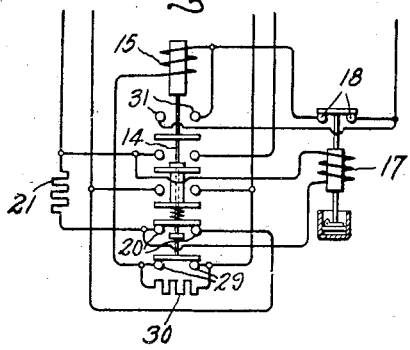

In the accompanying drawing, Fig. 1 is a diagram of a system for starting a synchronous motor embodying my invention and Fig. 2 is a modification of a portion of the system shown in Fig. 1.

Referring to Fig. 1, 1 represents a synchronous motor, the armature winding of which is arranged to be connected by means of a suitable switch 2, to the low voltage taps 3 and the high voltage taps 4 of the secondary winding of a polyphase transformer 5, the primary winding of which is connected to a suitable source of current 6. The synchronous motor is provided with a field winding which is connected to the slip rings 7 and preferably is also provided, for starting purposes, with an amortisseur winding upon its field structure.

10 is a generator which is connected to the motor 1 so as to be driven thereby. As shown in the drawing the generator is an exciter for the motor, and has a shunt field winding 11 and a series field winding 12, but it is evident that so far as my invention is concerned the generator 10 also may be used as a source of current for any other desired purpose such as supplying a distribution circuit (not shown).

It has long been the general practice, when starting synchronous motors, to start the motor with its field winding disconnected from its source of excitation. In some cases the field circuit is left open and in other cases it is short circuited through a high resistance. When the machine reaches substantially synchronous speed the field winding is connected to a suitable source of excitation. When the excitation circuit is completed in this manner, disturbances are set up in the supply circuit, especially if the exciting circuit is completed when the motor is not running at synchronous speed. It is therefore very desirable, especially when a large motor is being started, that the exciting circuit should be completed only when the motor is rotating at very near synchronous speed.

In accordance with my invention I provide an electromagnetically operated switch 14 which, when closed, connects the slip rings 7 across the brushes of the generator 10. As shown the switch 14 is arranged to be closed by the energization of a coil 15, the circuit of which is controlled by the voltage relay 16, which is connected across the brushes of the generator 10 so that it is responsive to the voltage thereof, and by a relay 17 which is connected so that it is energized in accordance with the current flowing through the field winding of the motor during the starting thereof. As is well known in the art, during the starting of a synchronous motor an alternating current voltage is induced in the field winding of the motor so that if a circuit is connected across the terminals of the field winding, alternating current flows through this circuit. The magnitude and frequency of this alternating current varies directly with the slip of the motor so that when the motor reaches synchronous speed the alternating current becomes zero. Thereby by providing a relay 17 which is so arranged that it does not close its contacts 18 until the current through its coil is substantially zero, the switch 14 cannot be closed to connect the field winding of the motor to the generator 10 until the motor has reached synchronous speed.

As shown, the switch 14 is also provided with the auxiliary contacts 20, which are arranged in any well known manner so as to be closed before the main contacts thereof are open and to be opened after the main contacts are closed. The contacts 20, when closed, complete a circuit across the slip rings 7 which includes in the arrangement shown in Fig. 1, the discharge resistor 21 and the primary winding 22 of a transformer 23. The coil of the relay 17 is connected across the secondary winding 24 of the transformer 23. While it is preferable to use a transformer so as to insulate the relay 17 from the high voltages induced in the field circuit, it is obvious that, if so desired, the relay 17 may be connected directly in series with field circuit or in shunt with some portion thereof such as the resistor 21 as shown in Fig. 2.

The relay 16, which is responsive to the voltage of the generator 10, is provided with the contacts 25 which are in the circuit of the coil 15 and which are closed only when the voltage of the generator is above a predetermined value. Therefore the switch 14 can be closed only when the source of excitation is in an operative condition. The relay 16, by means of its contacts 26, is also arranged to short circuit a portion of the resistor 27 in the circuit of the shunt field winding 11 of the generator so as to increase the building up of the generator voltage during the starting of the motor.

The switch 14 is also provided with the auxiliary contacts 29 and 31 which are in the circuit of the coil 15. The contacts 29, when closed, short circuit the resistor 30. The purpose of the resistor is to reduce the current through the coil 15, after the switch 14 is closed, as the amount of current required to hold the switch closed is much less than the amount required to close it. The contacts 31 when closed complete a shunt circuit around the contacts 18 so that if the rush of current through the primary winding 22, at the instant the switch 14 closes and before the contacts 20 open, causes the relay 17 to open its contacts 18 the opening of these contacts will not deenergize the coil 15.

The operation of the system shown in Fig. 1 is as follows: When the motor is at rest the various switches are in the position shown in the drawing. It will be observed that the discharge resistor 21, the contacts 20, and the primary winding 22 of the transformer 23 are connected in series across the slip rings 7, but since no current is flowing through this circuit the contacts 18 of the relay 17 are closed. The circuit of the coil 15 is open, however, at the contacts 25 of the relay 16, since this relay is not energized.

To start the motor the switch 2 is moved so as to connect the motor to the low voltage taps 3. As soon as the armature circuit of the motor is closed, a relatively high voltage is generated in the field winding of the motor by reason of the relative movement between the rotating flux of the armature and the initially stationary field winding. This high voltage causes current to flow through the coil of the relay 17 so that the relay immediately opens its contacts 18.

The motor operates as an induction motor when the armature circuit thereof is completed. As the speed of the motor builds up the voltage of the generator 10 increases. When the generator voltage reaches a predetermined value the relay 16 opens its contacts 26, thereby increasing the resistance of the shunt field circuit of the generator to the necessary value to maintain the generator voltage at the desired value when synchronous speed is reached. When the relay 16 operates, the contacts 25 in the circuit of the coil 15 are closed.

When the motor reaches substantially synchronous speed the current through the field circuit of the motor decreases rapidly substantially to zero so that the relay 17 closes its contacts. In order to accomplish this object a relay which will not start to close its contacts before the current fluctuations decrease substantially to zero is required. In the arrangement shown the relay is provided with a dashpot to prevent this premature closing of the contacts but it is evident that this result may be obtained by other well known means. This time delay is preferably made adjustable in any well known manner so that the proper time delay may be obtained to accomplish the desired result.

When both of the contacts 18 and 25 are closed a circuit is completed for the coil 15 across the brushes of the generator 10. This circuit also includes the contacts 29 so that when the switch 14 is closed, the resistor 30 is inserted in the circuit of the coil 15. When the circuit of the coil 15 is completed, the switch 14 is closed to connect the slip rings 7 across the generator 10 and the contacts 20 are opened to open the circuit across the slip rings which includes the discharge resistor and the primary winding of 22 of the transformer 23.

After the field circuit of the motor is completed across the generator, the switch 2 is moved so as to connect the motor across the high voltage taps 4 of the transformer thereby completing the starting operation of the motor.

The operation of the modification shown in Fig. 2, will be obvious from the description heretofore given in connection with embodiment shown in Fig. 1, so that a description thereof is believed to be unnecessary.

While I have, in accordance with the patent statutes, shown and described my invention as applied to a particular system and as embodying various devices diagrammatically indicated, changes and modifications will be obvious to those skilled in the art, and I, therefore aim in the appended claims to cover all such changes and modifications as fall within the true spirit and scope of my invention.

What I claim as new and desire to secure by Letters Patent of the United States is:

1. In combination, a source of alternating current, a synchronous dynamo electric machine, means for connecting said machine to said source to start said machine, a generator driven by said machine, switching means, electromagnetic means for controlling said switching means, a circuit for said electromagnetic means, contacts in said circuit means responsive to the voltage of said generator for controlling certain of said contacts, and means responsive to the current induced in the field winding of said machine during the starting thereof for controlling other of said contacts.

2. In combination, a source of alternating current, a synchronous dynamo electric machine, means for connecting said machine to said source to start said machine, a direct current generator driven by said machine, switching means for connecting said generator to the field winding of said machine, electromagnetic means for controlling said switching means, a circuit for said electromagnetic means, contacts in said circuit means responsive to the voltage of said generator for controlling certain of said contacts, and means responsive to the current induced in the field winding of said machine during the starting of said machine for controlling other of said contacts independently of said voltage responsive means.

3. In combination, a source of alternating current, a synchronous dynamo electric machine having an armature winding and a field winding, means for connecting said armature winding to said source to start said machine, a generator driven by said machine, electromagnetic switching means for connecting said generator to the field winding of said machine, a circuit for said electromagnetic switching means, contacts in said circuit arranged to be closed when the voltage of said generator exceeds a predetermined value and other contacts in said circuit arranged to be closed when the current induced in said field winding during the starting of said machine decreases below a predetermined value.

4. In combination, a source of alternating current, a synchronous dynamo electric machine having an armature winding and a field winding, means for connecting said armature winding to said source to start said machine, a generator driven by said machine, a discharge resistor, a circuit including said field winding and said resistor, electromagnetic switching means arranged to interrupt said circuit and to establish connection between said field winding and said generator, a circuit for said electromagnetic switching means, a relay responsive to the voltage of said generator for controlling said last mentioned circuit, and another relay connected so as to be energized in accordance with the current through said discharge resistor during the starting of said machine for controlling said last mentioned circuit.

5. In combination, a source of alternating current, a synchronous motor, means for connecting said motor to said source to start said motor, a discharge resistor, a circuit including said resistor and the field winding of said motor, a generator driven by said motor, a resistor in the field circuit of said generator, electromagnetic switching means arranged to interrupt said circuit and to connect the field winding of said motor to said generator, a circuit for said electromagnetic switching means, contacts in said last mentioned circuit, a relay responsive to the voltage of said generator for controlling said contacts and a short circuit around the resistor in the field circuit of said generator, other contacts in the circuit of said electroresponsive means, and a relay connected so as to be energized in accordance with the current through said discharge resistor during the starting of said machine for controlling said other contacts.

6. In combination, a source of alternating current, a synchronous dynamo electric machine, means for connecting said machine to said source to start said machine, a discharge resistor, a circuit including said resistor and the field winding of said motor, a source of excitation, electromagnetic switching means arranged to interrupt said circuit and to connect said source of excitation to the field winding of said machine a circuit for said electromagnetic switching means, contacts in said last mentioned circuit, means responsive to the current through said discharge resistor during the starting of said machine for controlling said contacts, and means controlled by said electromagnetic switching means for completing a shunt circuit around said contacts.

In witness whereof, I have hereunto set my hand this 16th day of June, 1924.

HERMAN BANY.